(12) United States Patent
Hedley et al.

(10) Patent No.: US 10,989,531 B2
(45) Date of Patent: Apr. 27, 2021

(54) METHOD OF SETTING-UP A RANGE-BASED TRACKING SYSTEM UTILIZING A TRACKING COORDINATE SYSTEM

(71) Applicant: COMMONWEALTH SCIENTIFIC AND INDUSTRIAL RESEARCH ORGANISATION, Campbell (AU)

(72) Inventors: Mark Hedley, Greenwich (AU); Dan Popescu, Belconnen (AU)

(73) Assignee: Commonwealth Scientific and Industrial Research Organisation, Campbell (AU)

( * ) Notice: Subject to any disclaimer, the term of this patent is extended or adjusted under 35 U.S.C. 154(b) by 113 days.

(21) Appl. No.: 15/503,913

(22) PCT Filed: Aug. 12, 2015

(86) PCT No.: PCT/AU2015/000484
§ 371 (c)(1),
(2) Date: Feb. 14, 2017

(87) PCT Pub. No.: WO2016/023069
PCT Pub. Date: Feb. 18, 2016

(65) Prior Publication Data
US 2017/0276480 A1 Sep. 28, 2017

(30) Foreign Application Priority Data
Aug. 15, 2014 (AU) .................. 2014903191

(51) Int. Cl.
*G01B 21/04* (2006.01)
*G01S 5/02* (2010.01)
(52) U.S. Cl.
CPC .......... *G01B 21/045* (2013.01); *G01S 5/0289* (2013.01); *G01S 5/0294* (2013.01); *G01S 5/0226* (2013.01); *G01S 2205/007* (2013.01)

(58) Field of Classification Search
CPC .... G01B 21/045; G01S 5/0289; G01S 5/0294
See application file for complete search history.

(56) References Cited

U.S. PATENT DOCUMENTS

2005/0228613 A1* 10/2005 Fullerton ............. G01S 5/0289
342/458
2006/0071783 A1* 4/2006 Culpepper ........... B60R 25/102
340/539.13

(Continued)

FOREIGN PATENT DOCUMENTS

CN 102231911 B 2/2014
WO WO 2008/116168 9/2008

(Continued)

OTHER PUBLICATIONS

Patwari al et, Locating the Nodes, 2005, IEEE Signal Processing Magazine, pp. 54-69 (Year: 2005).*

(Continued)

*Primary Examiner* — Lisa E Peters
(74) *Attorney, Agent, or Firm* — Caesar Rivise, PC

(57) ABSTRACT

Described herein is a method of setting-up a range-based tracking system utilising a tracking coordinate system that uses a plurality of spaced apart stationary nodes for tracking objects within a tracking environment. The method includes the step of transmitting signals between the stationary nodes to obtain range information between at least a subset of pairs of the nodes and determining coordinates for all of the stationary nodes in a node coordinate system using these range information. The method also includes the step of obtaining spatial information related to at least one of the nodes, the spatial information being indicative of one or more features or locations within the tracking environment and determining the location of all stationary nodes in the tracking coordinate system, wherein some or all of the (Continued)

coordinates of the stationary nodes are used for tracking objects in the tracking system.

15 Claims, 8 Drawing Sheets

(56) References Cited

U.S. PATENT DOCUMENTS

| | | | |
|---|---|---|---|
| 2007/0150176 A1 | 6/2007 | Zhang et al. | |
| 2007/0203768 A1* | 8/2007 | Adra | G01S 5/0294 340/539.13 |
| 2007/0217379 A1 | 9/2007 | Fujiwara et al. | |
| 2008/0288659 A1* | 11/2008 | Hasha | H04L 67/1095 709/250 |
| 2009/0043504 A1* | 2/2009 | Bandyopadhyay | G01C 17/38 701/469 |
| 2009/0137255 A1* | 5/2009 | Ashley, Jr. | G01S 5/0289 455/456.1 |
| 2010/0074133 A1* | 3/2010 | Kim | H04J 3/0682 370/252 |
| 2010/0271263 A1 | 10/2010 | Moshfeghi | |
| 2011/0140969 A1 | 6/2011 | Ergen | |
| 2011/0188389 A1 | 8/2011 | Hedley et al. | |
| 2013/0138247 A1* | 5/2013 | Gutmann | G05D 1/0274 700/253 |
| 2013/0225200 A1* | 8/2013 | Ben Hamida | G01S 5/0289 455/456.1 |
| 2014/0031059 A1* | 1/2014 | Rhoads | G08G 1/08 455/456.1 |
| 2014/0035725 A1* | 2/2014 | Bruemmer | G05D 1/0274 340/8.1 |
| 2014/0139375 A1* | 5/2014 | Faragher | G01S 5/0294 342/451 |
| 2014/0274155 A1* | 9/2014 | Langberg | H04W 4/029 455/456.3 |

FOREIGN PATENT DOCUMENTS

| | | |
|---|---|---|
| WO | 2009143559 A1 | 12/2009 |
| WO | 2010000036 A1 | 1/2010 |
| WO | 2012065233 A1 | 5/2012 |
| WO | 2013010204 A1 | 1/2013 |
| WO | 2013166546 A1 | 11/2013 |

OTHER PUBLICATIONS

Supplementary Partial European Search Report for corresponding European Patent Application No. EP15831589 dated Mar. 16, 2018.
International Search Report for PCT/AU2015/000484, dated Oct. 29, 2015.
"A Bilinear Approach to the Position Self-Calibration . . . ", Crocco, M. et al., IEEE Transactions on signal processing. vol. 60, No. 2, Feb. 2012, uploaded Feb. 14, 2017.
"Multidimensional Scaling: I. Theory and Method", W. S. Torgerson, Psychometrika, vol. 17, No. 4, pp. 401-419, Dec. 1952, uploaded Feb. 14, 2017.
Popescu, D. C., "A manifold flattening approach for anchorless localization", Wireless Networks 18, No. 3, 2012, pp. 319-333.
Porta J M et al: "On the Trilaterable Six-Degree-of-Freedom Parallel and Serial Manipulators" Proceedings of the Apr. 2005 IEEE, International Conference on Robotics and Automation, pp. 960-967.
Phillip A Regalia et al: "On distance reconstruction for sensor network localisation" 2010 IEEE International Conference on Acoustics Speech and Signal Processing (ICASSP), pp. 2866-2869.
Supplementary European Search Report for corresponding EU Patent Application No. EP 15831589, dated Aug. 28, 2018.

\* cited by examiner

METHOD OF SETTING-UP A RANGE-BASED TRACKING SYSTEM UTILIZING A TRACKING COORDINATE SYSTEM

CROSS-REFERENCE TO RELATED APPLICATIONS

This U.S. national phase application claims the benefit under 35 U.S.C. § 371 of PCT application no. PCT/AU2015/000484 filed on Aug. 12, 2015 entitled A METHOD OF SETTING-UP A RANGE-BASED TRACKING SYSTEM UTILISING A TRACKING COORDINATE SYSTEM which in turn claims the benefit to Australian application no. 2014903191 filed Aug. 15, 2014 and all of whose entire disclosures are incorporated by reference herein.

FIELD OF THE INVENTION

The present invention relates to a method of setting-up a range-based tracking system utilising a tracking coordinate system and more particularly to a method of simplified deployment of a wireless tracking system to track the location of one or more mobile nodes within a field of interest.

Embodiments of the invention have been particularly developed for tracking players on a sporting field. While some embodiments will be described herein with particular reference to that application, it will be appreciated that the invention is not limited to such a field of use, and is applicable to tracking other mobile units or personnel, such as emergency workers, miners and mining equipment in and around a mine site, construction workers working with hazards, employees within a business location and customers and/or shopping carts in a shopping mall.

BACKGROUND

Any discussion of the background art throughout the specification should in no way be considered as an admission that such art is widely known or forms part of common general knowledge in the field.

Wireless tracking systems generally refer to systems that track or locate a transceiver using wireless technologies, including transmission and reception of electromagnetic signals. Wireless tracking is beneficial in many practical applications to enhance worker safety and/or productivity, to allow for consumer location based services and to facilitate the delivery of sporting or entertainment services. More particularly, the knowledge of the location of people and mobile equipment over a period of time may be used to enhance the safety of people on a work site. Knowing the location of patients within a hospital or care facility enables assistance to rapidly reach them if they should go missing, fall or press a panic button. Tracking the location of people within a building may allow security staff to be alerted if a person enters an area to which they are not authorised. Tracking the location of emergency services personnel enhances their safety by enabling assistance to be rapidly dispatched via a known route to the correct location if required. Tracking athletes during sporting events or training provides valuable information for coaches for training and rehabilitation, and well as for use by the electronic media.

Many of the aforementioned applications require accurate tracking in indoor environments where satellite based tracking systems, such as GPS do not operate, hence a local positioning system (LPS) needs to be used. This must be tolerant to substantial multipath interference due to reflection of radio signals in the local environment. A number of wireless tracking techniques are well known in LPS systems to measure the position of mobile transceivers (or nodes). These techniques include multilateration which uses range measurements between nodes, triangulation which uses angle measurements between nodes, received signal strength (RSS) fingerprinting which compare RSS measurements to a database of previous measurements at known locations, and hyperbolic navigation which uses time difference of arrival (TDOA) measurements. Multilateration is known to be most suitable for accurate tracking for sports applications. Range is typically computed based on measurement of time of arrival (TOA) of radio signals. It is also known that there are other methods to measure range that include but are not limited to the use of optical or acoustic signals, and measurement of the RSS of radio signals.

A typical range based tracking system consists of stationary reference nodes installed at fixed and known locations, and mobile nodes attached to the objects being tracked. The distance between each mobile node and local reference nodes is measured using wireless signals, and from this the location of each mobile node can be determined using well known principles such as multilateration.

A major impediment to the use of such systems is the skill and time required, and hence the relatively high cost involved, to initially setup the network. This usually requires manually determining the location of reference nodes, and can include generating a map of interest where a suitable map is not available. For example, to gain the required accuracy for tracking player movements on a sporting field it is usual to fix a plurality of spaced apart reference nodes at precisely defined locations. To gain the required precision in the location of those nodes it is usual to first undertake a survey of the tracking environment to gain the coordinates for each of the fixed reference nodes and coordinates of features of interest to provide a context for mobile node locations while they are being tracked. This survey typically involves skilled operators using specialised equipment.

Techniques are known for the self-calibration of sensors in tracking systems. For example, see "A Bilinear Approach to the Position Self-Calibration of Multiple Sensors", Crocco, M. et al., IEEE Transactions on signal processing, Vol. 60, No. 2, February 2012. However, these techniques involve applying anchorless localisation to reference nodes, which generates an arbitrary coordinate system that has no relation to the environment or application. Various other anchorless localisation techniques are known. Exemplary publications including anchorless localisation techniques include:

Popescu, D. C., et al., "*A manifold flattening approach for anchorless localization*" Wireless networks 18, No. 3, 2012. pages 319-333.

Chinese Patent Publication 102231911 B to Nanjing University of Technology entitled "Method for carrying out multidirectional scaling positioning on wireless sensor network by distance sensing".

US Patent Application Publication 2011/0140969 A1 to Ergen and Jalil entitled "Method and system for hybrid positioning using partial distance information".

W. S. Torgerson, "*Multidimensional Scaling: I. Theory and Method*", Psychometrika, vol. 17, no. 4, pp. 401-419, December 1952.

The above techniques utilising anchorless localisation all make a contribution towards improving the efficiency of setting up a wireless tracking system. However, like Crocco et al., the coordinate systems generated by the techniques in the above references bear no relation to the environment or application in which the tracking is to be performed.

The inventors have realised that, by contrast, it is important to make use of feature nodes so that the mobile node locations computed by the tracking system have a known relationship to the environment. For example the use of feature nodes allows a map of the environment to be generated, updated, or an existing map aligned to the tracking system without requiring a skilled operator to conduct a survey.

Any discussion of the prior art throughout the specification should in no way be considered as an admission that such prior art is widely known or forms part of common general knowledge in the field.

SUMMARY OF THE INVENTION

It is an object of the present invention to overcome or ameliorate at least one of the disadvantages of the prior art, or to provide a useful alternative.

In accordance with a first aspect of the present invention, there is provided a method of setting-up a range-based tracking system utilising a tracking coordinate system, the tracking system making use of a plurality of spaced apart stationary nodes for tracking objects within a tracking environment, the method including the steps of:
  (a) transmitting signals between the stationary nodes to obtain range information from the tracking system, the range information being indicative of ranges between at least a subset of pairs of the nodes;
  (b) using the range information to perform anchorless localisation to determine coordinates for all of the stationary nodes in a node coordinate system;
  (c) obtaining spatial information related to at least one of the nodes, the spatial information being indicative of one or more features or locations within the tracking environment; and
  (d) determining the location of all stationary nodes in the tracking coordinate system, wherein some or all of the coordinates of the stationary nodes are used for tracking in the tracking system;
    wherein the tracking coordinate system is determined using the spatial information for a plurality of nodes or the tracking coordinate system is derived from the node coordinate system.

In one embodiment, the tracking coordinate system is derived by applying a transformation to the node coordinate system based on the spatial information.

In one embodiment, the spatial information includes information specifying at least one of an origin or an orientation of the tracking coordinate system and the transformation includes applying a rigid transformation to the node coordinate system. In another embodiment, the spatial information includes coordinates in an application coordinate system and the transformation includes an alignment of the tracking coordinate system with the application coordinate system.

In one embodiment, the spatial information includes one or more features of interest within the tracking environment.

In one embodiment, the method includes the step of generating or updating a digital map in the tracking coordinate system.

In one embodiment, the method includes the step of recording the coordinates of the one or more features of interest.

In one embodiment, the method includes the step of removing one or more of the stationary nodes prior to performing the tracking.

In one embodiment, the tracking is performed using mobile nodes and the mobile and stationary nodes utilise the same hardware.

In one embodiment, the step (b) includes the steps of:
  (i) defining a matrix of ranges between respective pairs of stationary nodes;
  (ii) populating the matrix with the measured ranges;
  (iii) for each measured range, generating an estimated range using other measured ranges; and
  (iv) updating the matrix with the estimated ranges.

Preferably, step (iii) includes iteratively performing the sub steps of:
  (iii)(A) forming a plurality of simplexes, each including respective subsets of nodes;
  (iii)(B) for simplexes having a single common unknown range, estimating the unknown range from the known ranges in the simplexes; and
  (iii)(C) further populating the matrix.

In one embodiment, the step of anchorless localisation includes the steps of:
  a. defining a matrix of ranges between respective pairs of stationary nodes;
  b. populating the matrix with the range information;
  c. if the matrix is incomplete, generating an estimate for an unknown range and further populating the matrix; and then
  d. assigning coordinates in the node coordinate system to the nodes based on the matrix.

In one embodiment, one or more of the stationary nodes are Smartphones or tablet computers.

In accordance with a second aspect of the present invention, there is provided a method of reducing errors in the estimation of ranges between nodes of a range-based tracking system, the method including the steps of:
  a) defining a matrix of measured and unknown ranges between respective pairs of nodes;
  b) populating the matrix with the measured ranges;
  c) for each measured range, generating an estimated range using other measured ranges; and
  d) substituting some or all of the measured ranges in the matrix with the estimated ranges.

In one embodiment, step (c) includes iteratively performing the sub steps of:
  (c)(i) forming a plurality of simplexes, each containing the node pair defining the respective measured range, and for which all ranges are measured; and
  (c)(ii) for a given pair of nodes sharing a predetermined number of associated simplexes, estimating the range from the known ranges in the associated simplexes.

In accordance with a third aspect of the present invention, there is provided a computer system configured to perform a method according to the first or second aspects.

In accordance with a fourth aspect of the present invention, there is provided computer program configured to perform a method according to the first or second aspects.

In accordance with a fifth aspect of the present invention, there is provided non-transitive carrier medium carrying computer executable code that, when executed on a processor, causes the processor to perform a method according to the first or second aspects.

In accordance with a sixth aspect of the present invention, there is provided range-based tracking system set up by the method according to the first aspect.

BRIEF DESCRIPTION OF THE DRAWINGS

Embodiments of the invention will now be described, by way of example only, with reference to the accompanying drawings in which.

DETAILED DESCRIPTION

Overview of an Exemplary Range-Based Tracking System

Described herein is a method of setting-up a range-based tracking system utilising a tracking coordinate system. Before describing the method, a general description of an exemplary range-based tracking system will be provided for context.

Figure 1:
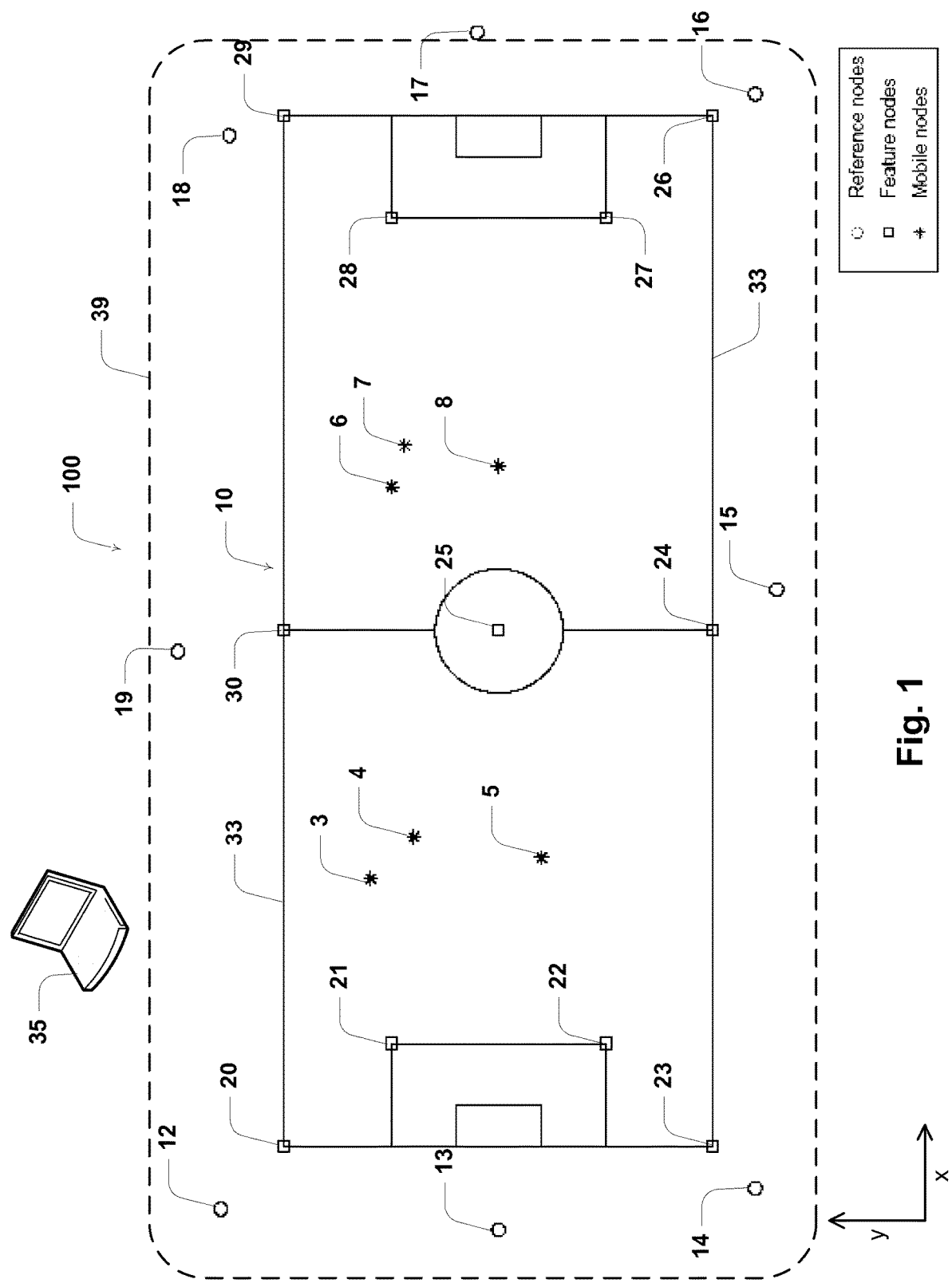
FIG. 1 is a schematic plan view of a range-based tracking system set up to track the location of football players across a football playing field.

A range-based tracking system makes use of a plurality of spaced apart stationary nodes for tracking objects within a tracking environment. Referring to FIG. 1, the method of setting up will be described herein with reference to setting up a system 100 to track the location of objects in the form of football players (not shown) around a tracking environment in the form of a football playing field 10.

Although the invention will be described herein with reference to this particular application, it will be appreciated by those skilled in the art that the invention is applicable to tracking players in other sports and in a range of other applications to track other objects in other tracking environments. These other applications include tracking mining personnel and mining equipment in and around a mine site, tracking workers, equipment and hazards in and around a construction site, tracking employees within a business location, tracking fire-fighters and other emergency personnel within a building or hazardous area and tracking customers and/or shopping carts in a shopping mall. In these other applications, the tracking hardware used may be different to that described herein. For example, wireless nodes used to track vehicles may be connected to the vehicle's battery.

In system 100, the players each carry a wireless battery operated mobile node. Six nodes 3 to 8 are shown in FIG. 1 and are illustrated as '*' symbols. Mobile nodes 3 to 8 each include respective transceivers, processors and non-transient memory. It will also be appreciated that, although system 100 is being described with reference to six nodes 3 to 8, in other embodiments a different number of nodes are tracked.

For example, when system 100 is used to track the location of players in a game of football, there will typically be eleven players on each team, plus two or more reserves for each team, providing a total of more than twenty six mobile nodes for which the location is tracked. In some embodiments, additional nodes are carried by the referee and linesmen, making a total of twenty nine mobile nodes. In other embodiments, further nodes are worn by other officials or other personnel such as coaches to raise an alert when those coaches approach an area that they are not permitted to enter.

Prior to performing the steps of method 100, a plurality of stationary nodes is deployed on or near playing field 10 (or more generally the tracking environment). System 100 includes nineteen spatially separated wireless stationary nodes 12 to 30, each including respective transceivers, processors and non-transient memory. The stationary nodes are divided into eight stationary reference nodes 12 to 19 (illustrated as circle symbols) circumferentially disposed around field 10 and eleven stationary feature nodes 20 to 30 (illustrated as square symbols) disposed at different points on field markings 33 of field 10. Markings 33 include the field side and end lines, a halfway line, centre circle and goal boxes. Markings 33 are examples of spatial information associated with field 10.

Feature nodes 20 to 30 are placed on markings 33, which, as described below, represent spatial information that provides a spatial link between the arbitrary node positions and the particular tracking environment. Where no existing map of playing field 10 or local area is available, the linear formation of markings 33 enables the creation of a local map or coordinate system without the need to survey the area. The reference nodes are deployed at locations conducive to good performance for tracking the mobile nodes on the field.

In some embodiments, this spatial information includes a map of the playing field or local area for display purposes. In other applications, feature nodes are placed on other contextually relevant features or at regions of interest within the tracking environment. In some applications, the spatial information can provide locations of hazardous regions for generating alerts when a mobile node comes into close proximity with such a region.

In contrast to feature nodes, reference nodes 12 to 19 can be placed at any convenient location within or around playing field 10 (or equivalently the tracking environment) so long as they are within a sufficient range to permit communication between at least some of the other nodes. A single reference or feature node need not be able to communicate directly with all other stationary nodes but may communicate through intermediate nodes. Typically, reference nodes 12 to 19 are positioned around and/or throughout a tracking environment such that, during tracking, a mobile node is within range of two or more stationary nodes.

This network of nodes of known relative location establishes a tracking field 39 across field 10, wherein tracking of the location of wireless nodes 3 to 8 is to be performed in the tracking coordinate system. In the illustrated case, some or all feature nodes may be placed in locations that would interfere with play. Such feature nodes are removed prior to commencement of the game. The remaining feature nodes may be retained, and for those that remain they may change role to become reference nodes for location tracking of mobile nodes.

In other embodiments, some or all feature nodes are able to be maintained in their respective positions during tracking operation. Those feature nodes that remain during the tracking operation are subsequently treated as reference nodes (i.e. a stationary node can take on roles of both feature node for setup and reference node for operation).

Both feature and reference nodes utilise the same hardware and software. However, in other embodiments, it will be appreciated that different transceiver hardware and software is able to be used for different reference or feature nodes. In some embodiments, some or all of the stationary nodes are Smartphones or tablet computers.

Mobile nodes 3 to 8 are typically constructed physically smaller and lighter than the stationary nodes so as to minimise the discomfort when worn by players. Stationary nodes, by comparison, are typically larger, having increased connectivity and functionality and a larger battery. Mobile node hardware can also be used to perform the role of a stationary node. This can minimise the required hardware and cost for a system, for example allowing mobile nodes to be used as feature nodes during the initialisation stage, and worn by players during the operational stage.

In various embodiments, the mobile and stationary nodes include rechargeable or single-use batteries. In other embodiments, however, at least some of the mobile and stationary nodes are not directly battery operated but are electrically connected to a power source. By way of example, the stationary nodes deployed around playing field 10 are powered through wired electrical connections into local power outlets of the electrical grid or a portable generator. In an application where mobile nodes are carried within a vehicle, the mobile nodes may be powered by the vehicle.

In future implementations, embodiments are envisaged wherein one or more of the mobile transceivers are Smartphones. Such applications for these implementations include tracking customers through a shopping mall and tracking visitors to an exhibition or trade show.

Figure 2:
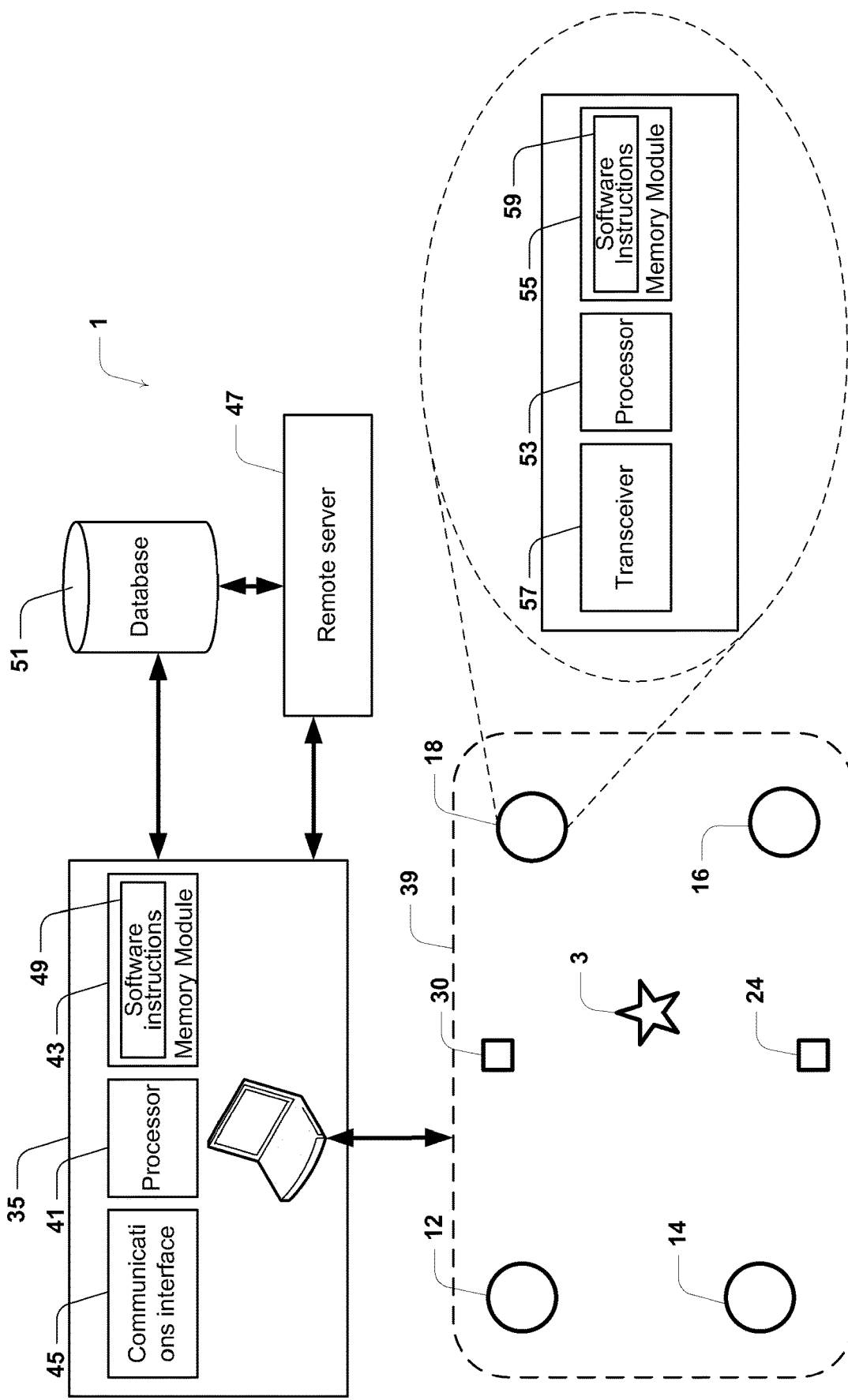
FIG. 2 is a schematic system-level overview of the system of FIG. 1.

An exemplary system-level overview of system 100 is illustrated schematically in FIG. 2. For simplicity, only reference nodes 12, 14, 16 and 18, feature nodes 24 and 30, and mobile node 3 are illustrated. A network is established between the various stationary nodes and an arbitrary back-end computer system 35. In some embodiments, reference nodes 12 to 19 communicate through a wired network or a network including a combination of wireless and wired communications. In some cases, the various nodes need not communicate directly but may communicate indirectly through intermediate nodes in the network.

In various embodiments, computer system 35 can take different forms, including a single computer networked with the stationary nodes, multiple processors associated with the stationary nodes or some or all of the stationary nodes themselves. In some embodiments, computer system 35 is realised as more than one computer to utilise better signal coverage and redundancy. In embodiments where some or all of the stationary nodes in the system perform the function of computer system 35, no separate computer is required.

Computer system 35 includes a processor 41 configured to run executable software instructions 49 that, amongst other functionalities, facilitates a method of setting-up of the range-based tracking system for tracking mobile nodes 3 to 8. During the subsequent operational stage, computer system 35 is configured to determine and monitor mobile node locations and optionally display these on a display (either associated with computer system 35 or in communication with computer system 35 through a network).

Processor 41 is coupled to a memory module 43 and a communications interface 45. Interface 45 includes a USB port for communicating with reference nodes 12 to 19 through a USB connection. In other embodiments, interface 45 includes other connections such as an Internet connection, modem, Ethernet port, wireless network card, serial port, or the like and is able to also communication with a remote server 47. In other embodiments distributed resources are used. For example, in one embodiment, computer system 35 includes a plurality of distributed servers having respective storage, processing and communications resources. Memory module 43 includes software instructions 49, which, as mentioned, are executable on processor 41. In some embodiments, computer system 35 is coupled to an associated database 51, which is in turn coupled to server 47. In further embodiments the database leverages memory module 43.

Following the setting up of the tracking system, system 100 facilitates obtaining location data of the mobile nodes across playing field 10 in an operational stage. The mobile nodes transmit data to computer system 35 to enable the mobile node locations to be computed. In other embodiments, the locations of the mobile nodes are computed by the mobile nodes themselves. Software instructions 49 are implemented as part of a software application for setting up tracking field 39 and obtaining location data of the mobile nodes. In some embodiments, each of the stationary and mobile nodes in turn includes a local processor 53 coupled to a local memory module 55 and a transceiver 57. Memory module 55 includes software instructions 59 which are executable on local processor 53 to obtain location data. The location data is processed and stored in database 51. In some embodiments, processing of the location data is performed at server 47.

In some embodiments, the processor is located within one or more of the various stationary or mobile nodes. In these embodiments, remote computers are able to connect to the processor to extract the location data generated by the tracking process.

Method of Setting-Up a Range-Based Tracking System

Figure 3:
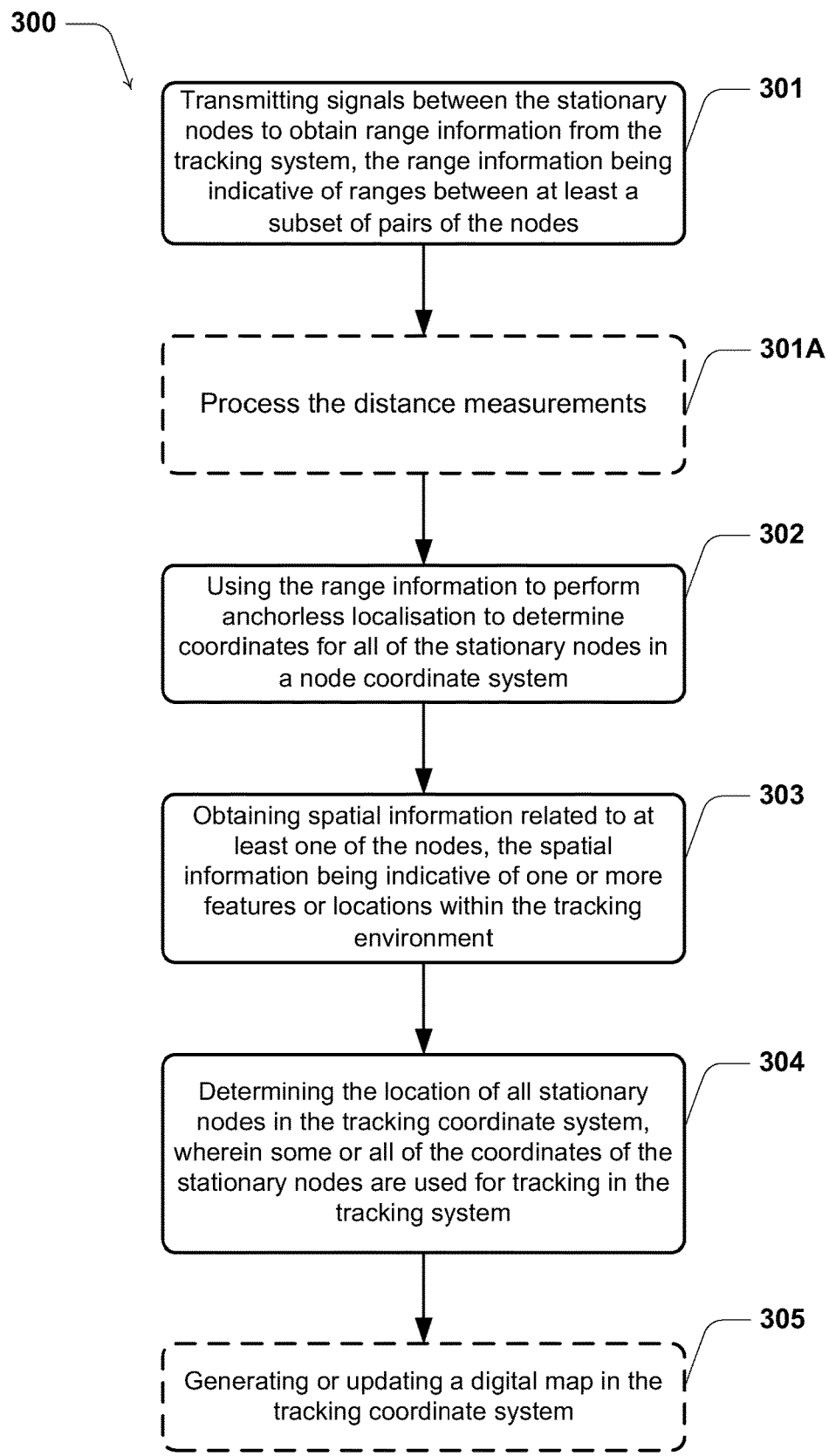
FIG. 3 is a process flow chart illustrating the primary steps in a method of setting up a range based tracking system such as the system of FIG. 1.

Referring now to FIG. 3, there is illustrated a process flow diagram illustrating the primary steps in a method 300 of setting-up a range-based tracking system such as system 100. As described below under the heading "Exemplary system-level overview", method 300 is performed by one or more computer processors, such as computer system 35, in wired or wireless communication with the stationary nodes.

At step 301, with the stationary nodes in place, signals are transmitted between the stationary nodes to obtain range information from the tracking system. The range information includes numerical range data indicative of ranges between at least a subset of pairs of the nodes. Sometimes it is not possible to obtain range information for all possible pairs of nodes due to a number of factors including the distance between the nodes being too great or interference from obstacles occurring between the nodes. In some embodiments, these unknown ranges are estimated by a range estimation procedure, as described below.

At step 301A, which is optional, data processing is performed to improve range measurements for localisation. Where multiple range values are available for a node pair a filter can reduce errors. Calculating a median range is one such filter. Another technique for reducing range errors is outlined below which only requires a single range measurement for each node pair.

At step 302, the range information is used to perform anchorless localisation to determine coordinates for all of the stationary nodes (both reference and feature nodes) in a node coordinate system. The node coordinate system is an arbitrary coordinate system determined by the anchorless localisation procedure. The node coordinate system is arbitrary in the sense that the stationary nodes are allocated coordinates that do not relate to any real coordinate system and are not associated with the tracking environment.

Although the node location will be described and illustrated with reference to a particular anchorless localisation procedure performed on two-dimensional coordinates, it will be appreciated that the procedure can also easily accommodate coordinate systems having more or less than two dimensions. Moreover, it will also be appreciated that other known anchorless localisation procedures are able to be used for this step in place of the procedure described herein. Such other anchorless localisation procedures include but are not limited to those procedures discussed in the publications listed in the Background section of this patent specification.

A description of an exemplary anchorless localisation procedure is provided in the next section.

At step 303, spatial information is obtained which relates to the feature nodes. The spatial information is indicative of one or more features or locations within the tracking environment. For example, the spatial information may include one or more features of interest within the tracking environment. In the case of system 100, field lines 33 represent spatial information. In other applications, the spatial information includes the location of terrain features such as trees, rivers, lakes, hills, mountains, mapped hazards and coastlines within or near the region of interest. In further embodiments, the spatial information are items of infrastructure such as roads, signs, power poles, survey markers, buildings, building features, pipes and land boundaries within or near the region of interest.

Many of the steps can occur in an altered sequence or in parallel. For example Steps 302 and 303 are interchangeable in order. That is, the spatial information relating to the feature nodes can be obtained after the anchorless localisation process has been performed.

Finally, at step 304, the location of all stationary nodes in the tracking coordinate system is determined. Some or all of the coordinates of the stationary nodes are then used for tracking in the range-based tracking system. In some embodiments, the spatial information for the feature nodes is used to directly derive a tracking coordinate system for all of the stationary nodes. In some cases, the spatial information includes coordinates in an application coordinate system provide by a software application or the like. Here the transformation includes an alignment of the tracking coordinate system with the application coordinate system.

Techniques for aligning the tracking coordinate system with the application coordinate system include minimising the sum of the square of the distance between the transformed coordinates of the features in the map and the coordinates of the feature nodes. A variation on this technique can be used if the application coordinate system is not correctly scaled. In this case, the coordinate transformation includes a scaling operation. Another variation can be applied where the application coordinate system is only a loose representation of the region of interest and the transformation includes an affine transformation or other warping operation. An example of this in the context of playing field 10 is where the location information is derived from a vector drawing template of the typical field line markings, but the actual physical laying down of field markings 10 is not in congruence with the template. As such, the template is warped to match the actual markings as measured using the feature nodes.

In other embodiments, the tracking coordinate system is derived from the node coordinate system. For example, the tracking coordinate system may be derived by applying a transformation to the node coordinate system based on the spatial information. In some cases, the spatial information includes information specifying at least one of an origin or an orientation of the tracking coordinate system, such as field markings 33 of system 100, and the transformation includes applying a rigid transformation to the node coordinate system. In some embodiments, the transformation includes a rotation, translation and/or scaling of the node coordinate system.

Use of the spatial information provides for quickly and simply establishing tracking field 39 on which the location of players carrying mobile nodes 3 to 8 can be displayed. As the positions of the reference nodes are now known in the tracking coordinate system, the feature nodes may be operated as reference nodes or optionally removed prior to commencing tracking. The removal of feature nodes is advantageous in the case of system 100 where their locations would impede the play of the football game on field 33.

In some embodiments, an additional step 305 of generating or updating a digital map in the tracking coordinate system is performed. In the context of tracking football players, the digital map allows for the real or non real-time monitoring of the players' positions by overlaying the tracking data on the map.

As the spatial information relates the arbitrary node coordinate system to the real work tracking environment, in one embodiment, the placement of feature nodes is used to record the coordinates of the one or more features of interest. By placing one or more feature nodes at or around a feature of interest within the tracking environment, the above method enables coordinates of the feature of interest to be recorded in the tracking coordinate system. This has applications in mapping of the features or environment.

It will be appreciated that the present invention is applicable to setting up tracking systems for tracking mobile node location in one, two or three dimensions. For an n-dimensional location tracking, the minimum number of required reference nodes during the operational stage is equal to n+1. However the performance of the tracking system generally improves through the use of more reference nodes. To maintain sufficient accuracy in this two dimensional tracking application, it is preferable for a mobile node to be within range of at least three reference nodes at all times.

Performing Anchorless Localisation—Step 302

Figure 4:
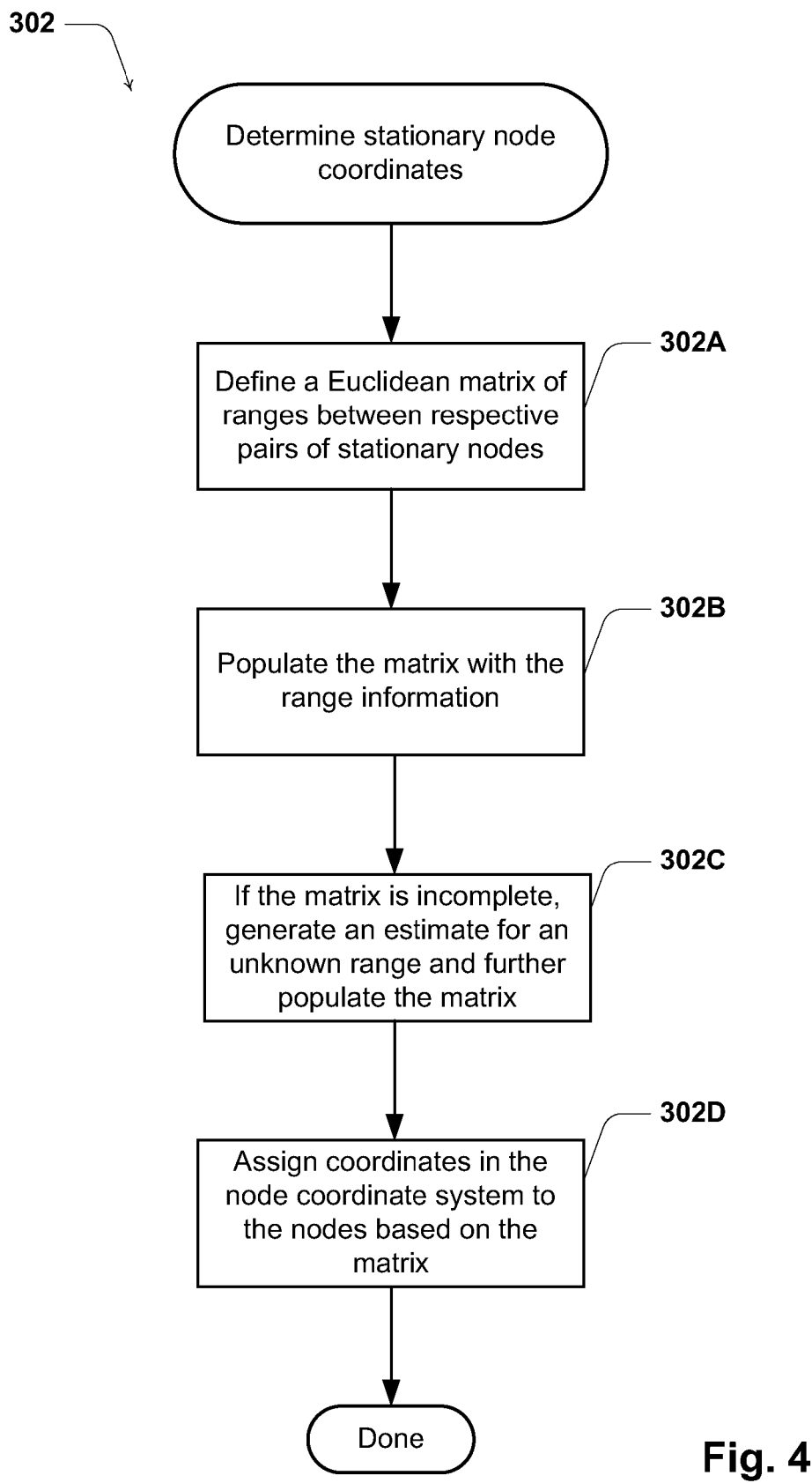
FIG. 4 is a process flow chart illustrating an exemplary method of determining stationary node coordinates.

Once the range information is obtained at step 301, the software application on computer system 35 is used to perform an anchorless localisation procedure 302. Whilst techniques for anchorless localisation are known, an exemplary anchorless localisation procedure 302 is illustrated in FIG. 4.

At sub-step 302A, a Euclidean matrix of ranges or distances between all possible pairs of stationary nodes is defined. Commonly the matrix of the square of the distance is used. This type of matrix is known as a Euclidean Distance Matrix (EDM).

At sub-step 302B, the matrix is populated with the range information. As it is not usually possible to measure the distances between all pairs of stationary nodes, the distance matrix is generally an initially incomplete matrix. Accordingly, at step 302C, estimates for the unknown distances are obtained and the matrix is further populated with the estimates.

Figure 5:
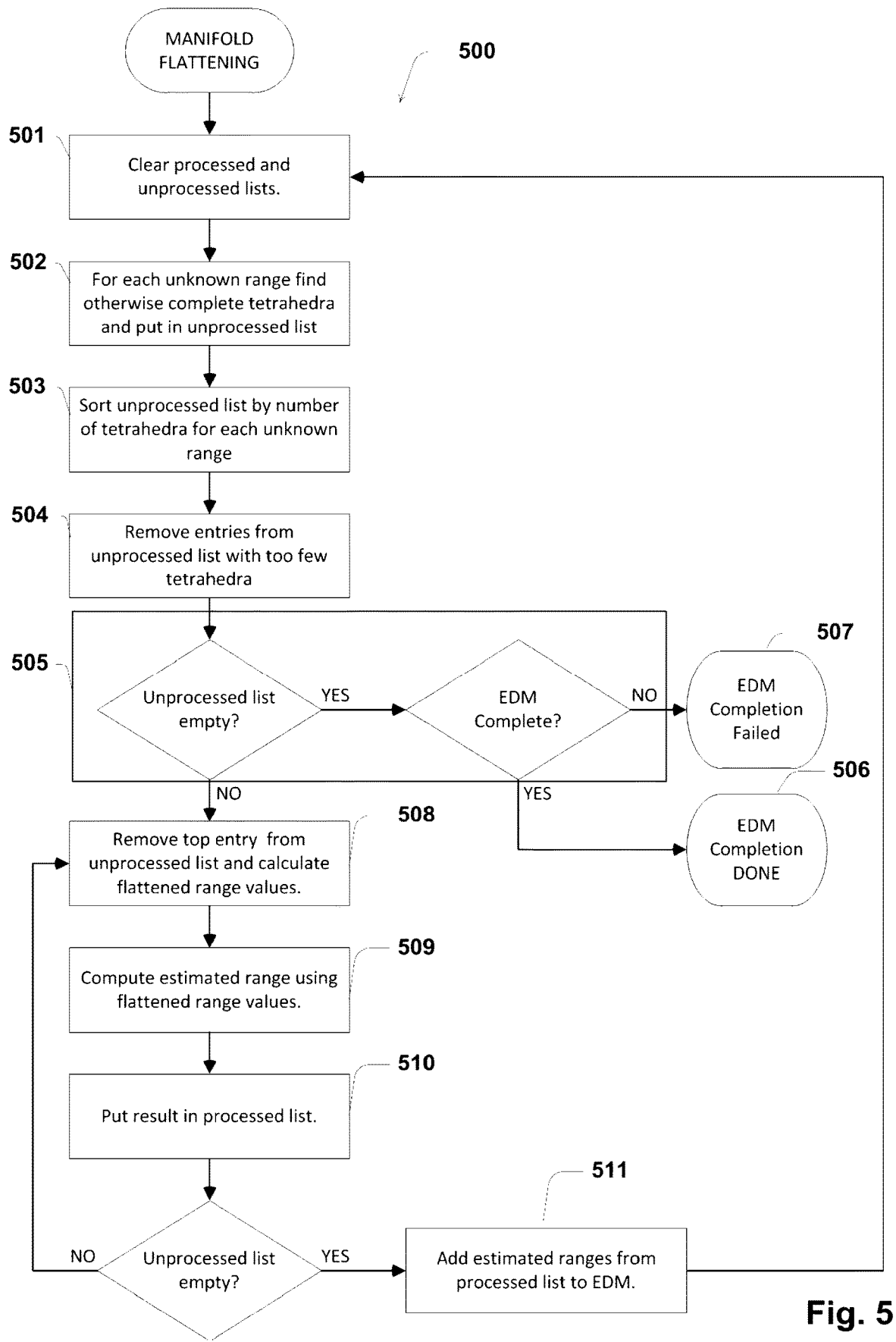
FIG. 5 is a process flow chart illustrating steps in an exemplary manifold flattening procedure for determining unknown node pair distances in the setting up of a range-based tracking system.

A number of procedures for estimating the missing distances at step 302C (or square of the distances in the case of an EDM) are possible. One technique involves using a manifold flattening procedure. An exemplary manifold flattening procedure 500 is now described with reference to FIG. 5. Other techniques for EDM completion are also known in the literature.

Procedure 500 commences with an incomplete EDM as input, and estimates values for the missing node-pair distance values. The following description is based on two-dimensional anchorless localisation and all stationary nodes are distributed on a planar two-dimensional surface. However the procedure can be extended to three-dimensional anchorless localisation.

Procedure 500 makes use of two defined data lists: an 'unprocessed' list and a 'processed' list. The unprocessed list contains unknown distances from the EDM that have yet to be processed, and the processed list contains unknown distances from the EDM for which a distance has been estimated but not yet updated in the EDM. It will be appreciated that other techniques are possible that do not make use of such lists.

At step 501, the processed and unprocessed lists are cleared from data of a previous iteration. At step 502, simplexes in the form of tetrahedra are formed from sets of four nodes such that all but one of the ranges between nodes are known. The unknown node pair distances are calculated as follows. Taking any set of four nodes that are fully connected (i.e. have node pair distance measurements known between all pairs of nodes in the set) the nodes form a tetrahedron in three-dimensional space. However as the nodes are assumed planar, this tetrahedron should be flat and hence have zero volume. In general, in dimension k (for two-dimensional anchorless localisation k=2) the volume of a simplex (which is a tetrahedron for k=2) is denoted by V which is given by $$(-1)^{k+1} 2^k (k!)^2 V^2 = \begin{vmatrix} 0 & d_{12}^2 & d_{13}^2 & \cdots & d_{1(k+1)}^2 & 1 \\ d_{12}^2 & 0 & d_{13}^3 & \cdots & d_{2(k+1)}^2 & 1 \\ \vdots & \vdots & \vdots & \ddots & \vdots & \vdots \\ d_{1(k+1)} & d_{2(k+1)} & \cdots & \cdots & 0 & 1 \\ 1 & 1 & 1 & \cdots & 1 & 0 \end{vmatrix}.$$

The distance between nodes i and j is denoted by $d_{ij}$. If one distance in a tetrahedron is unknown this gives two solutions for the unknown distance. The basis of the procedure is that unknown distances will typically form part of many tetrahedra of four stationary nodes in which the other distance measurements are known. For each tetrahedron there are two estimates of the node pair distance, and by processing these values from multiple tetrahedra the unknown distance can be estimated.

The EDM is scanned to find all unknown node pair distances, and each of these unknowns are added to the unprocessed list. For each unknown node pair distance, the tetrahedra which contain the unknown distance and for which all other distances are known are found and linked to the unknown distance in the unprocessed list.

At step 503, the unprocessed list is sorted by the number of tetrahedra that include each unknown node pair distance so that processing commences with the unknown distance with the maximum number of tetrahedra. At step 504, entries in the unprocessed list with too few tetrahedra to enable reliable estimation of the distance are removed from the list. These removed entries will be examined again in a subsequent iteration when additional node pair distances have been estimated and hence more tetrahedra are available.

In one embodiment, a fixed threshold on the minimum number of tetrahedra is used. In another embodiment, the threshold is computed based on a histogram of the number of tetrahedra for the unknown distances. In yet another embodiment, a maximum of M unknown distances is retained in the unprocessed list with the largest number of tetrahedra, where M is a predefined integer. It will be appreciated that there are a number of other methods for selecting entries to remove from the unprocessed list.

At step 505, if the unprocessed list is empty and the EDM is complete then the unprocessed list will be empty and the initial distance estimation procedure has successfully completed (at 506). The unprocessed list can also be empty if there remain no unknown node pair distances that are included in a sufficient number of tetrahedra. In this case, the procedure cannot complete the EDM (at 507). If this occurs, a technician should consider varying the location of some of the various stationary nodes and commencing the procedure again.

If the unprocessed list is not empty, the procedure progresses to step 508. For each entry in the unprocessed list, a pair of potential node pair distances is computed for each tetrahedron. These potential distances represent the two solutions that flatten the tetrahedron. One of each pair is correct except for the effect of errors in the values of the known distances in the tetrahedron. The known distances are used in step 509 in processing the pairs of potential distance values to estimate the unknown distance. An exemplary technique for solving the unknown distance is described here. However, it will be appreciated that a number of other methods are available to solve this problem.

Denote the unknown distance by d. An initial estimate of this is given by the value or values that minimise $$f_1(d^2) = \Sigma_{i=1}^m V_i^4$$

There will be at most two viable solutions, which are denoted by d' and d". All initial estimates are used to generate a list by selecting the closest one of the two distance solutions for each tetrahedron. If there was more than one initial estimate, only the list with the lowest variance is retained. This list is sorted in ascending order of its values. Denote the maximum and minimum values in the list by $d_{max}$ and $d_{min}$. The list is culled to only retain the longest consecutive run of values such that the difference between the maximum and minimum values in the culled list does not exceed $$(d_{max} - d_{min})/2.$$

This is repeated recursively until the difference between the maximum and minimum value falls below a threshold or there are only two elements remaining. The estimated value of the unknown node pair distance is the average of the remaining potential distances in the culled list.

At step 510, the unknown distance is removed from the unprocessed list and added to the processed list along with the estimated distance. Once all values in the unprocessed list have been processed, at step 511, the EDM is updated with the estimated distances in the processed list and the algorithm is repeated.

Referring again to FIG. 4, at final sub-step 302D, coordinates of the stationary nodes in the node coordinate system are calculated using multidimensional scaling based on the matrix values. Multidimensional scaling is a well known technique in the art, and it will be appreciated that there are a number of multidimensional scaling or other techniques available to calculate node location using the EDM. A brief overview of metric multidimensional scaling is provided below.

Denote the completed EDM by D, which is of size n×n for measurements with n stationary nodes. Let $$X=(x_1, x_2, \ldots x_n)$$

be a matrix containing the centred coordinates of the stationary nodes which is an anchorless localisation solution. Then $$B = X^T X = -\frac{1}{2} H_n D H_n$$

where H is the n×n centering matrix, having 1−1/n on the diagonal and −1/n elsewhere. Since the matrix B is positive semidefinite it can be written as $$B = \Gamma_n \Lambda_n \Gamma_n^T \approx \Gamma_k \Lambda_k \Gamma_i^T$$

with $\Gamma_n$ and $\Lambda_n$ the (real) matrices of (column) unit eigenvectors and (diagonal) eigenvalues of B, and $\Gamma_k$ and $\Lambda_k$ obtained from the retention of the k dominant eigenvalues and eigenvectors. A natural solution for the anchorless localisation is $$X = \Lambda_k^{1/2} \Gamma_k^T$$

For two-dimensional localisation, k=2.

Method of Reducing Errors in the Estimation of Ranges

Figure 6:
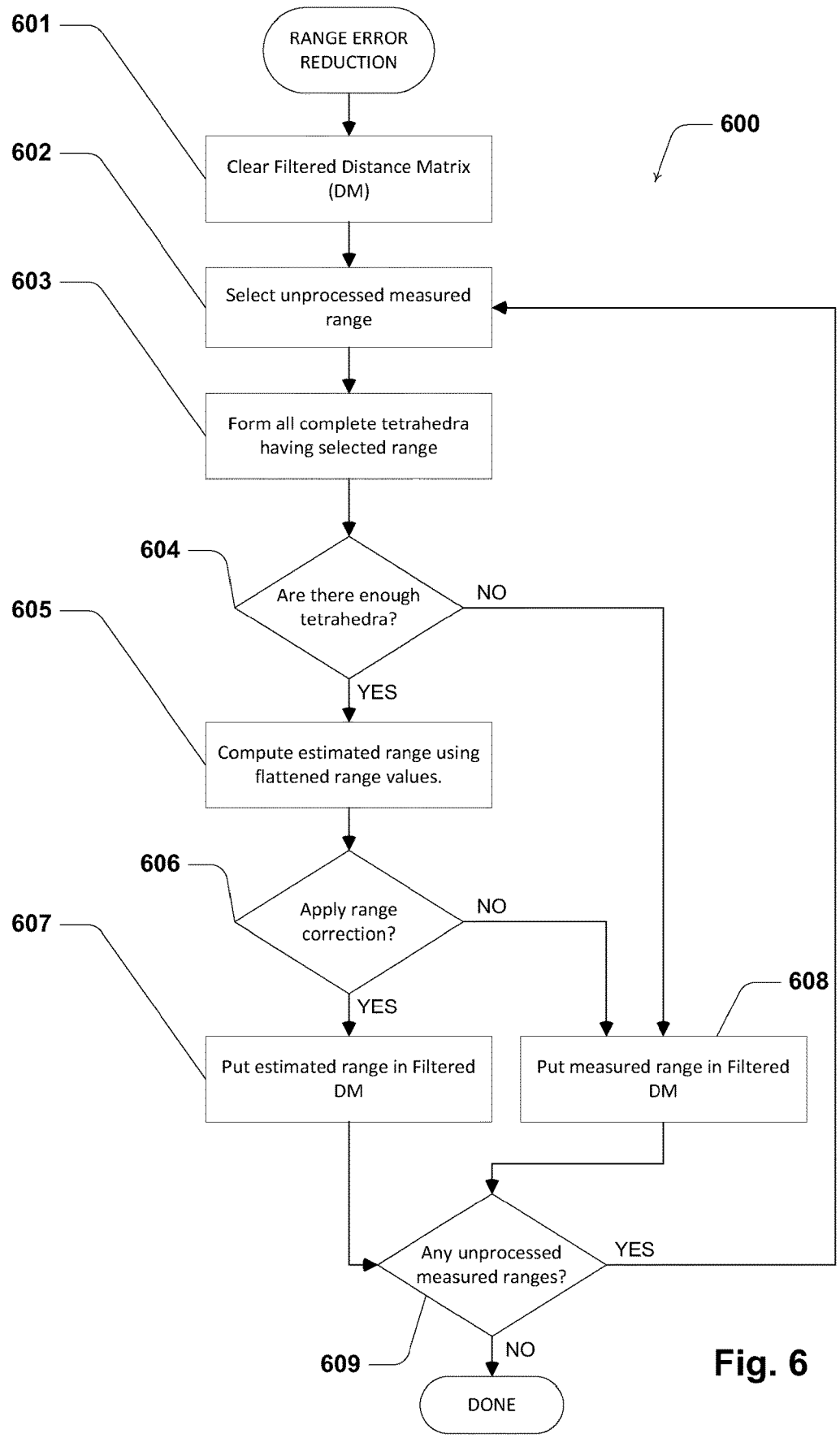
FIG. 6 is a process flow chart illustrating steps in an exemplary method of reducing errors in the estimation of ranges between stationary nodes in a range-based tracking system.

The above described manifold flattening technique 500 is typically used for EDM completion to estimate the unknown node pair distances. Here the already measured node pair distances are inputs and remain unchanged. An optional variation of this method is to use the procedure to also process the measured node pair distance values to attempt to reduce errors in the distances (step 301A of FIG. 3). This can be performed as method 600 illustrated in FIG. 6. Method 600 can be performed in conjunction with method 500 to more accurately estimate the already measured ranges. Alternatively, the method can be performed at any time after the initial node pair distances have been estimated.

Method 600 includes a number of steps common to method 500. However, rather than iterating back to the initial step, in method 600, each range is treated individually, and assessed independent of the others once only, based on an initial condition, such as belonging to a sufficient number of complete simplexes. After this one pass, at step 606, a decision is made whether or not to replace each measured value with the estimated one. If the decision is 'yes', then the measured range is substituted with estimated range at step 607. In method 600, each measured node pair distance value is selected in turn and assumed to be unknown, and the manifold flattening method is used to estimate that distance. The measured value can be replaced by the estimated value after all estimates are determined.

Figure 7:
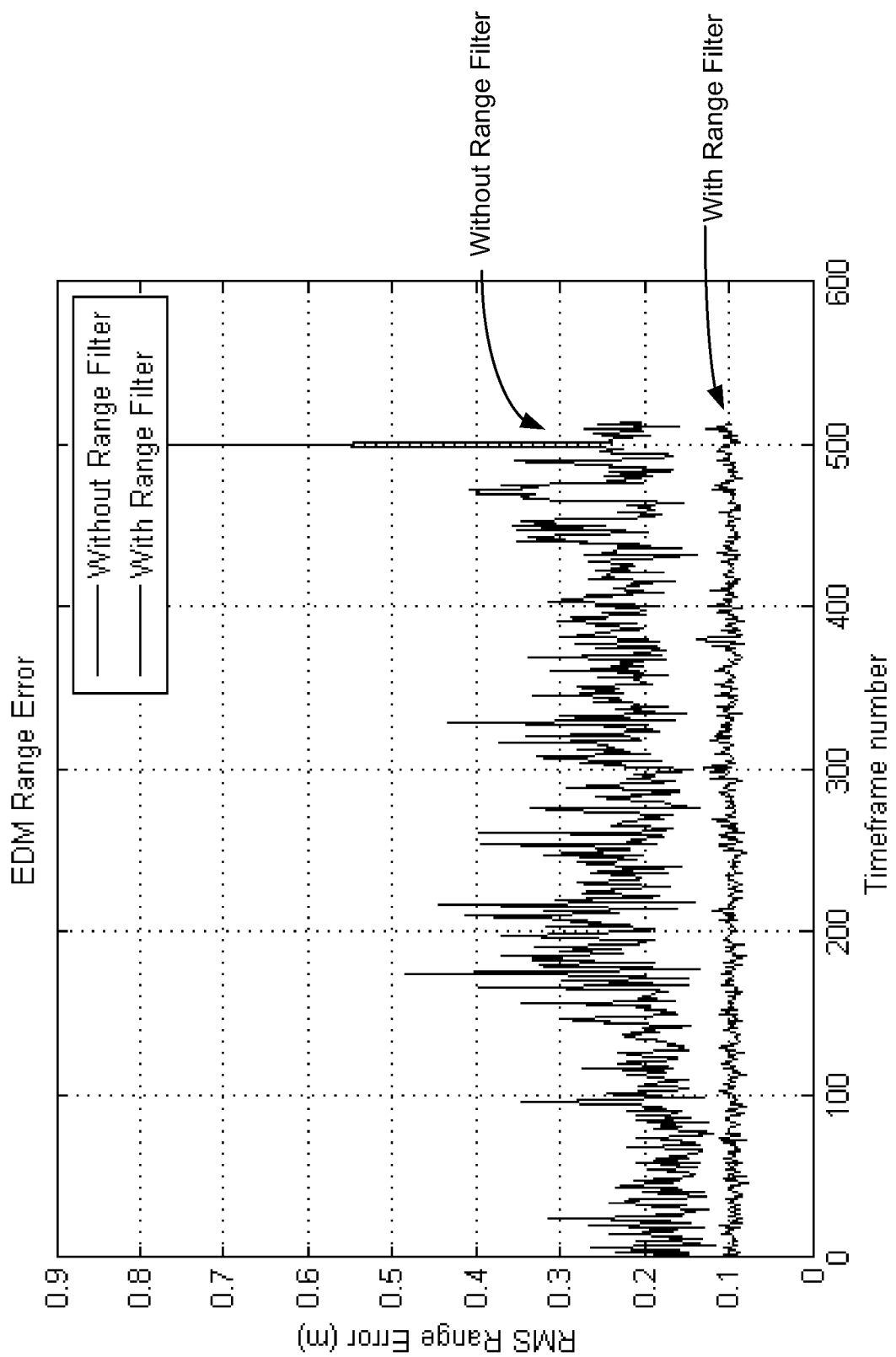
FIG. 7 is a graph of the error in node pair distance (range) measurements, both with and without a range filter.
Figure 8:
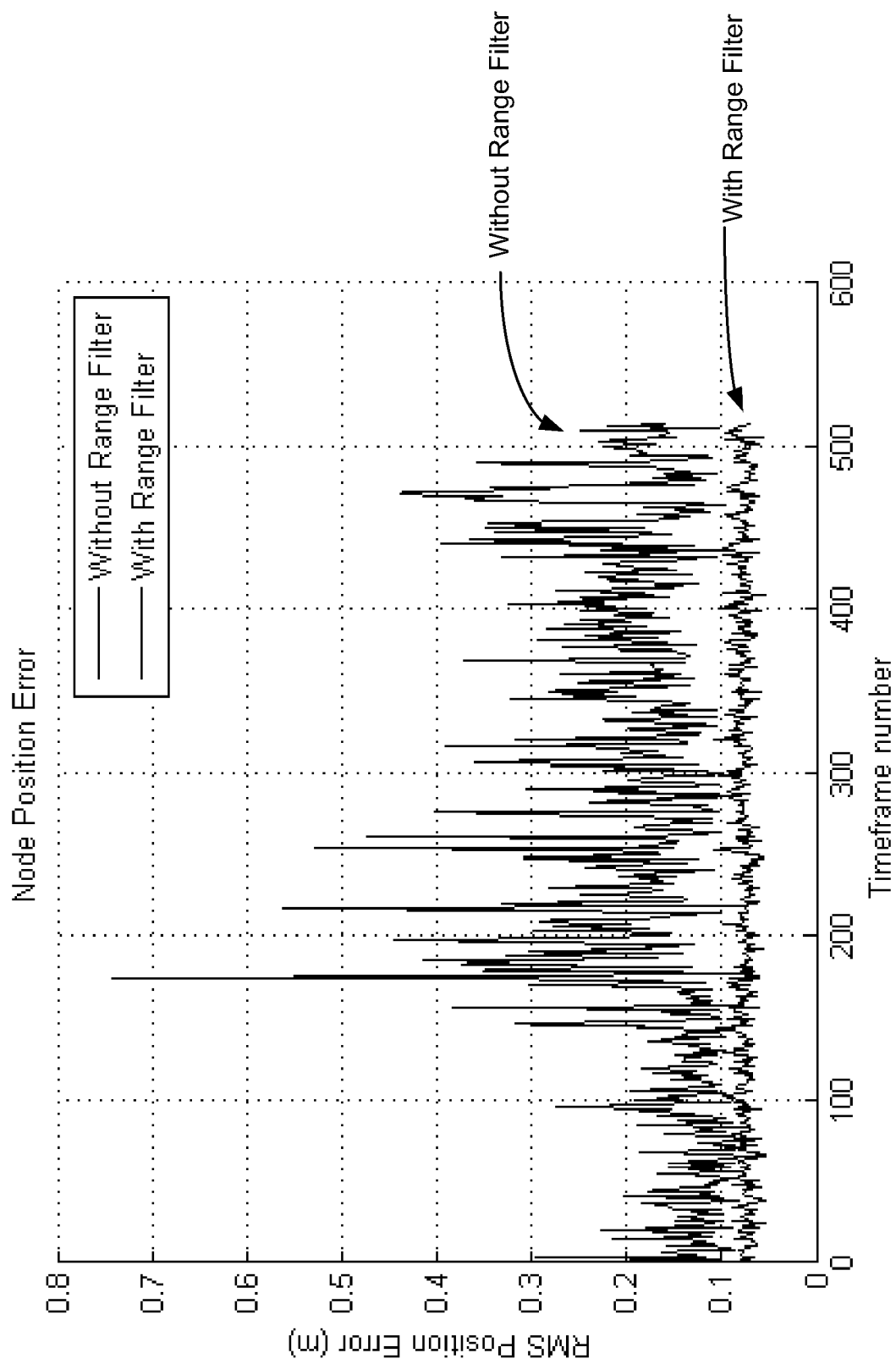
FIG. 8 is a graph of the RMS node position error derived from the node pair distance data in FIG. 7, both unfiltered and filtered data are illustrated.

This process has been found to be beneficial to reduce distance measurement errors for the processing of node pair distances as part of the setup of the tracking system, and also during the mobile node location calculation during system operation. At step 606, the replacement can be automatic or only performed when the error between the measured and estimated range values is above a predetermined threshold. The benefit of this procedure can be seen using measured data on a sports field for which an accurate survey was available. The distance error over a number of discrete time measurements is seen to be greatly improved, as illustrated in the exemplary data set of FIG. 6, and this results in a more accurate estimation of the stationary node locations, as seen in FIG. 7.

Performing Object Location Tracking

To track the location of the mobile nodes, the distance between each mobile node and multiple stationary nodes is measured and used to calculate the location of the mobile node using the process of multilateration. There exist a number of known methods for the wireless measurement of distance, including round trip ranging based on measurement of transmit and receive times of wireless signals, and based on measurement of received signal strength using a radio propagation model. In some embodiments, tracking of the mobile nodes is performed using only distance measurements between each mobile node and multiple reference nodes. However, in other embodiments, cooperative localisation is performed, which also requires distance measurements between mobile nodes.

Exemplary multilateration tracking techniques are disclosed in the following earlier published patent applications by the present applicant:

PCT Patent Application Publication WO 2013/166546 A1 entitled "Wireless positioning";

PCT Patent Application Publication WO 2013/010204 A1 entitled "Wireless localisation system";

PCT Patent Application Publication WO 2012/065233 A1 entitled "Tracking location of mobile devices in a wireless network";

PCT Patent Application Publication WO 2010/000036 A1 entitled "Wireless localisation system"; and PCT Patent Application Publication WO 2009/143559 A1 entitled "Measurement of time of arrival".

The contents of the above documents are incorporated herein by way of cross reference.

It will be appreciated that the present invention is flexible in the selection of the particular localisation and tracking technique. An input to any such technique is the coordinates of the reference nodes, computed in the initialisation stage. Another input can be the range measurements between nodes. The computed mobile node locations are passed to the software application run on computer 35 or an external server (not shown), as is the location information output from the initialisation stage. Where generated, other material, such as created maps or feature coordinates can also be passed to the application. As in the initialisation stage, distance measurements may be pre-processed to reduce noise or other errors prior to computing location. The process of measuring mobile node distances from stationary nodes and subsequently computing mobile node locations is iterated until it is instructed to terminate.

In system 100, the actual computation of mobile node distance and location can be performed in computer 35, which is called a location server that receives information from nodes. Alternatively, the computation can be performed on other devices. However, in various other embodiments, the computation is performed in a wide range of devices including the mobile nodes themselves, one or more static nodes (which may or may not include a computer terminal) or an associated processor or server in communication with tracking system 100. That is, the location tracking is able to be performed locally within system 100 or remotely from system 100.

CONCLUSIONS

It will be appreciated that the disclosure above provides a method of establishing a wireless tracking system to track the location of one or more mobile transceivers.

Embodiments of the present invention simplify the deployment of a wireless tracking system by using spatial information relating to the local tracking environment. This allows a wireless tracking system to be quickly and easily setup without requiring specialist skills such as surveying, thereby enabling the system to be deployed by a much larger range of technicians or users.

The rapid deployment of the tracking system also has useful applications in emergency situations. For example, it is often advantageous to track the location of fire-fighters within a burning building. This can be achieved quickly using the present invention by deploying feature nodes around the building and deploying feature nodes at pre-defined points on a plan of the building or surrounding area. The fire-fighters are given mobile transceivers when they enter the building and their location is able to be accurately tracked.

It is reiterated that the embodiments of the invention relate to the setting up of a range-based tracking system and this process is able to be applied to any range-based tracking system. The present invention is flexible in regards to the specific hardware or tracking algorithms implemented in the subsequent tracking.

Another aspect of the present invention relates to a novel method of reducing errors in the estimation of ranges between stationary nodes of a range-based tracking system. This can be applied to improve the accuracy of computed mobile node locations.

Interpretation

Throughout this specification, the terms "distance" and "range" in their various forms are used interchangeably to mean a numerical description of how far apart two nodes are.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

Unless specifically stated otherwise, as apparent from the following discussions, it is appreciated that throughout the specification discussions utilizing terms such as "processing," "computing," "calculating," "determining", analysing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fibre optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method of setting-up a range-based tracking system utilizing a tracking coordinate system, the range-based tracking system making use of a plurality of spaced apart stationary nodes for tracking objects within a tracking environment, the method including the steps of:
   (a) transmitting signals between the plurality of spaced apart stationary nodes to obtain range information from the range-based tracking system, the range information being indicative of ranges between at least a subset of pairs of the plurality of spaced apart stationary nodes, wherein the plurality of spaced apart stationary nodes includes at least one reference node and at least one feature node;
   (b) using the range information to perform anchorless localization to determine coordinates for all of the plurality of spaced apart stationary nodes in a node coordinate system;
   (c) obtaining spatial information related to the at least one feature node, the spatial information being indicative of an absolute location of one or more features or locations within the tracking environment; and
   (d) determining the location of all of the plurality of spaced apart stationary nodes in the tracking coordinate system, wherein some or all of the coordinates of the plurality of spaced apart stationary nodes are used for tracking in the range-based tracking system;
   wherein the tracking coordinate system is determined using the spatial information for the at least one feature node or the tracking coordinate system is derived from the node coordinate system by applying a transformation to the node coordinate system based on the spatial information; and
   further including the step of:
      changing the role of the at least one feature node to become a further reference node prior to performing tracking;
      wherein tracking is performed using mobile nodes and the mobile nodes and the plurality of spaced apart stationary nodes utilize the same hardware.

2. A method according to claim 1 wherein the spatial information includes information specifying at least one of an origin or an orientation of the tracking coordinate system and the transformation includes applying a rigid transformation to the node coordinate system.

3. A method according to claim 1 wherein the spatial information includes coordinates in an application coordinate system and the transformation includes an alignment of the tracking coordinate system with the application coordinate system.

4. A method according to claim 1 including the step of removing one or more of the plurality of spaced apart stationary nodes prior to performing the tracking.

5. A method according to claim 1 wherein the step of anchorless localization includes the steps of:
   a. defining a matrix of ranges between respective pairs of the plurality of spaced apart stationary nodes;
   b. populating the matrix with the range information;
   c. if the matrix is incomplete, generating an estimate for an unknown range and further populating the matrix; and then
   d. assigning coordinates in the node coordinate system to the nodes based on the matrix.

6. A method according to claim 1 wherein one or more of the plurality of spaced apart stationary nodes are Smartphones or tablet computers.

7. A computer system configured to perform a method according to claim 1.

8. A computer program configured to perform a method according to claim 1.

9. A non-transitive carrier medium carrying computer executable code that, when executed on a processor, causes the processor to perform a method according to claim 1.

10. A range-based tracking system set up by the method according to claim 1.

11. A method according to claim 1 wherein the spatial information includes one or more features of interest within the tracking environment.

12. A method according to claim 11 including the step of generating or updating a digital map in the tracking coordinate system.

13. A method according to claim 11 including the step of recording the coordinates of the one or more features of interest.

14. A method as claimed in claim 1 wherein said step (b) further includes the step of reducing the errors in the estimation of ranges between the plurality of spaced apart stationary nodes by the steps of:
   (i) defining a matrix of measured and unknown ranges between respective pairs of the plurality of spaced apart stationary nodes;
   (ii) populating the matrix with the measured ranges;
   (iii) for each measured range, generating an estimated range using other measured ranges; and
   (iv) updating the matrix with the estimated ranges.

15. A method according to claim 14 wherein step (iii) includes iteratively performing the sub steps of:
   (iii)(A) forming a plurality of simplexes, each including respective subsets of nodes;
   (iii)(B) for simplexes having a single common unknown range, estimating the unknown range from the known ranges in the simplexes; and
   (iii)(C) further populating the matrix.

* * * * *